US006216817B1

(12) United States Patent
Kannon et al.

(10) Patent No.: US 6,216,817 B1
(45) Date of Patent: *Apr. 17, 2001

(54) DAMPING STRUCTURAL SUBSTANCE AND A DAMPING COAT FORMING METHOD

(75) Inventors: Tatsumi Kannon; Shunichi Hayashi, both of Nagoya; Hidenao Kawai, Nishi-Kasugai-gun, all of (JP)

(73) Assignee: Mitsubishi Jukogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,914

(22) Filed: Apr. 17, 1998

Related U.S. Application Data

(62) Division of application No. 08/629,134, filed on Apr. 8, 1996, now abandoned.

(30) Foreign Application Priority Data

Apr. 27, 1995 (JP) .......... 7-103595
Feb. 15, 1996 (JP) .......... 8-27867

(51) Int. Cl.[7] .......... G10K 11/16; C08F 2/46; B05D 3/06

(52) U.S. Cl. .......... 181/296; 181/208; 181/175; 181/204; 181/207; 181/224; 181/294; 181/403; 522/96; 522/174; 427/371; 427/332; 427/508

(58) Field of Search .......... 522/96, 173, 174; 181/204, 224, 207, 294, 296, 403, 175, 208; 427/371, 332, 508

(56) References Cited

U.S. PATENT DOCUMENTS

| | | | | |
|---|---|---|---|---|
| 3,833,404 | * | 9/1974 | Sperling et al. | 117/63 |
| 3,847,726 | * | 11/1974 | Becker et al. | 161/186 |
| 4,387,139 | * | 6/1983 | Herwig et al. | 428/423.7 |
| 4,447,493 | * | 5/1984 | Driscoll et al. | 428/332 |
| 4,482,659 | * | 11/1984 | Sanjana et al. | 523/414 |
| 4,812,489 | * | 3/1989 | Watanabe et al. | 522/42 |
| 5,204,379 | * | 4/1993 | Kubota et al. | 522/96 |
| 5,238,744 | * | 8/1993 | Williams et al. | 428/412 |
| 5,262,232 | * | 11/1993 | Wilfong et al. | 428/327 |
| 5,279,896 | * | 1/1994 | Tokunaga et al. | 428/355 |
| 5,464,659 | * | 11/1995 | Melancon et al. | 427/387 |
| 5,474,840 | * | 12/1995 | Landin | 428/294 |

FOREIGN PATENT DOCUMENTS

| | | | |
|---|---|---|---|
| 56-10267 | | 7/1954 | (JP) . |
| 60-68367 | * | 5/1985 | (JP) . |

* cited by examiner

*Primary Examiner*—James J. Seidleck
*Assistant Examiner*—Sanza L McClendon
(74) *Attorney, Agent, or Firm*—Wenderoth, Lind & Ponack, L.L.P.

(57) ABSTRACT

A vibration damped structure, which is excellent in vibration absorption and sound absorption effect, is provided by coating the surface of a structure to be damped with a mixture of molten photopolymerizable resin and a photopolymerization initiator and then subjecting the coated surface to irradiation, whereby a vibration damping coating is formed on said surface.

6 Claims, 8 Drawing Sheets

A: A process of a molten mixture of a high molecular material of damping nature and a photopolymerization initiator being formed

⇩

B: A process of a piping unit being dipped in the molten mixture to be coated

⇩

C: A process of the piping unit being drawn up from the molten mixture

⇩

D: A process of ultraviolet rays being irradiated to the coated piping unit

⇩

F: A process of a damping high molecular coat being formed on the surface of the piping unit

Fig. 2(a)

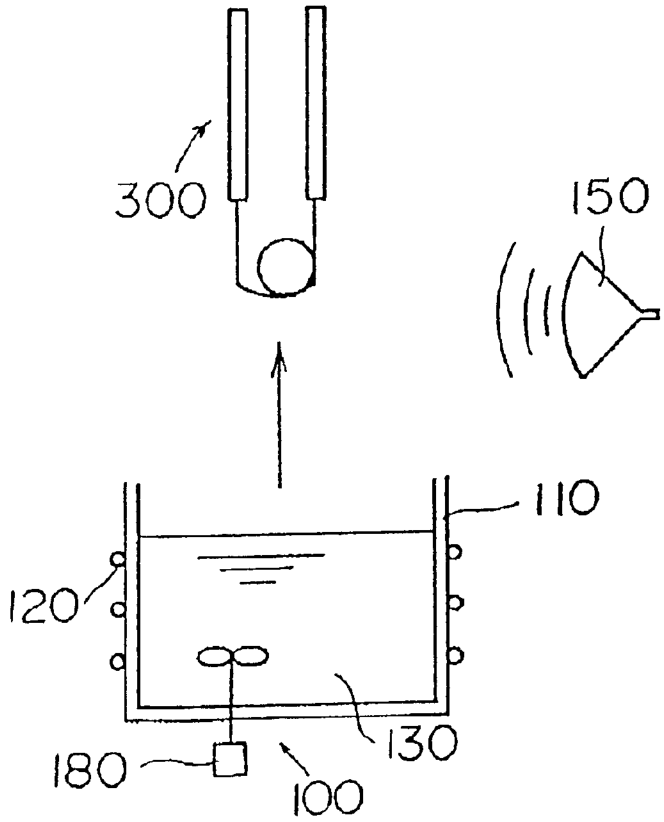

Fig. 2(b)

A: A process of a molten mixture of a high molecular material of damping nature and a photopolymerization initiator being formed

⇩

E: A process of a piping unit being sprayed with the molten mixture to be coated

⇩

D: A process of ultraviolet rays being irradiated to the coated piping unit

⇩

F: A process of a damping high molecular coat being formed on the surface of the piping unit

Fig. 3(a)

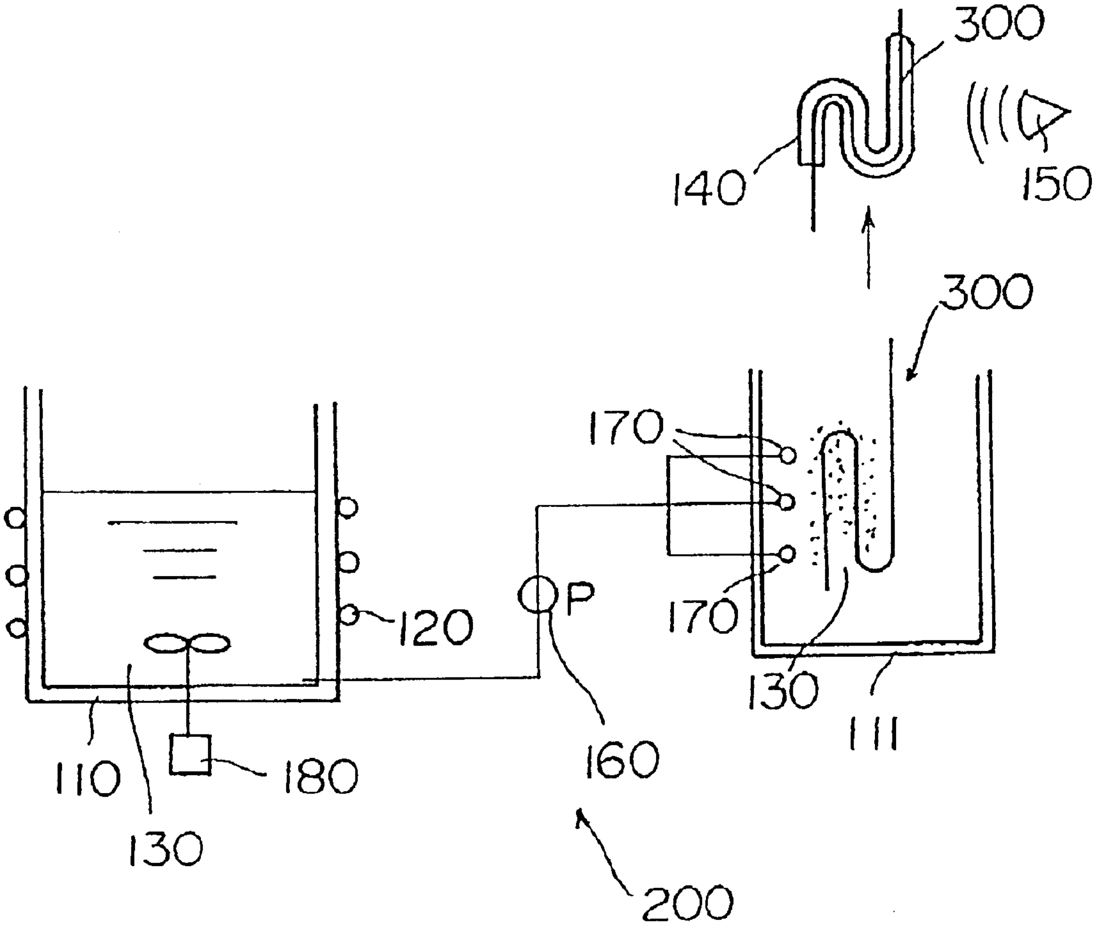

Fig. 3(b)

DAMPING STRUCTURAL SUBSTANCE AND A DAMPING COAT FORMING METHOD

This is a divisional of U.S. patent application Ser. No. 08/629,134, filed Apr. 8, 1996, now abandoned.

BACKGROUND OF THE INVENTION

1. Field of the Invention

The present invention relates to a damping structural substance and a damping coat forming method to be applied to air conditioners etc.

2. Description of the Prior Art

An air conditioner, as shown in FIG. 5, is composed of an outdoor unit 10, an indoor unit 20 and main pipings consisting of a high pressure piping 31 and a low pressure piping 32, both connecting the outdoor unit 10 and the indoor unit 20, and these components and parts compose a closed circuit in which an operating gas is enclosed.

The outdoor unit 10 is composed of such main components as a compressor 11, a four-way valve 12, a heat exchange device 13 including of a heat exchanger 131 and a fan 132, a silencer 14, a cooling capillary tube 15, an accumulator 16, a check valve 17, operational valves 181, 182, etc., and these components are contained within an outer shell structure 19.

The indoor unit 20 is composed of such main components as a heat exchange device 21 including of a heat exchanger 211 and an indoor side fan 212, a heating capillary tube 22, a check valve 23, etc., and these components are contained within an outer shell structure 28.

In the outdoor unit 10, as shown in FIG. 6, there are disposed a high density of various components, parts and pipings including many loop pipings and serpentine pipings. As for the capillary tube 15, in which a long tube of small inner diameter is used, the thin diameter portion is wound in loop shapes for the purpose of vibration prevention and good space arrangement.

The indoor unit 20 is, as shown in FIG. 7, composed of a bottom shell 191, a rear shell 192, front shells 193, 195 and a side shell 194. The pipings therein, having less components and parts, are not so complicated as in the outdoor unit 10 and are not shown, but a point that a capillary tube 22 consisting of a thin tube of loop shapes is disposed is same as in the outdoor unit 10.

A description is made below of a cooling operation and a heating operation of the air conditioner mentioned above. In the case of a cooling operation, a high temperature, high pressure gas compressed by said compressor 11 enters into the outdoor heat exchanger 131 via the four-way valve 12, is cooled to become a condensate, and is decompressed at the cooling capillary tube 15, and then is evaporated and gasified within the indoor heat exchanger 211 and is sucked into the compressor 11 via the four-way valve 12, thus a cycle is completed.

On the other hand, in case of a heating operation, the high temperature, high pressure gas compressed by the compressor 11 enters into the indoor heat exchanger 211 via the four-way valve 12, is cooled to become a condensate, and is decompressed at the heating capillary tube 22, and then is evaporated and gasified within the outdoor heat exchanger 131 and is sucked into the compressor 11 via the four-way valve 11, thus a cycle is completed.

In recent years, attempts are being made for realization of compact sizing and noise reduction of an air conditioner having such refrigeration cycle as mentioned above, but as the compact sizing and the noise reduction include a mutually contradictory contents, solving both problems at one time is very difficult.

In the conventional air conditioner, therefore, for a purpose of prevention of vibration transmission from the compressor 11, which is one vibration source, to the refrigeration cycle lines and for a purpose of prevention of refrigerant sound transmission caused at the time of phase changes of the refrigerant circulating in the refrigeration cycle, a damping member 9 of sheet shape wound around a piping 8 and a capillary tube 5, as shown in FIG. 8, is used.

The vibrations from the vibration source of the compressor 11 etc. are transmitted to the shell structures via supporting members, vibrate the sheets and become a cause to increased the noise of the unit. And the vibration substance generates air vibrations and causes a noise radiation.

The method of attaching the damping member 9 of sheet shape to the vibration substance for prevention of piping vibrations or sheet vibrations and for causing damping actions in the vibration substance is usually used not only for damping of piping units of loop shapes as mentioned above but also for damping of sheets.

In the conventional air conditioner, as mentioned above, the damping member of sheet shape wound around the piping and the capillary tube is used, however, in the damping member if used, there occur spaces between the piping and the capillary tube, by which a vibration absorption and sound absorption effect is lowered and according to the state of pressing by the winding of the damping member, there arises an a non-uniformity in the vibration absorption and noise absorption effect, and further accompanied with the compact sizing of air conditioner, the wound damping member touches the inner components and parts of the air conditioning unit, which cause unusual sounds and damages the pipings etc. Thus, there are shortcomings including those mentioned above in the prior art.

As one countermeasure to dissolve the shortcomings, there is a device disclosed by the Japanese laid-open utility model application No. Sho 60(1985)-68367. This relates, as shown in FIG. 9, to a damping structural substance 14 formed on a piping unit 17 by this piping unit 17, consisting of a piping 11 and a capillary tube 12, being dipped in, and drawn up from, a liquid rubber resin 13 filled in a vessel 16. This device requires, however, a long time for hardening of the resin 13 and has a problem in practical use.

SUMMARY OF THE INVENTION

In view of the problems of devices in the prior art, the present invention is disclosed with an object to provide a damping structural substance and a damping coat forming method which, being excellent in a vibration absorption and sound absorption effect and in compact sizing and productivity, are suitable for vibration prevention, and for noise reduction based on the vibration prevention, not only of piping units in an air conditioner but also of pipings in general structures such as straight pipes, serpentine pipes etc. or of sheet surfaces of shell structures forming outer shapes of structures e.g., a capillary tube, a piping unit containing such tube or a loop pipe.

(1) A damping structural substance of the present invention is characterized in that a damping coat consisting of a high molecular material of damping nature mixed with a photopolymerization initiator for causing a hardening reaction by a light irradiation is formed on the surface of a structure to be damped.

In the above, the damping coat, consisting of a high molecular material of damping nature, formed by a light irradiation on the surface of a structure to be damped is a coat of viscoelasticity nature with no restraint in which the internal loss is large and the modulus of elasticity is small and does damping actions by the internal loss factor being large.

For this reason, the damping structural substance provides good vibration absorption and sound absorption action, so that vibrations and sounds, transmitted to the structure to be damped, are absorbed well. Incidentally, in case of a laminated sheet being formed, the internal loss factor η is shown by the following formula, and as the thickness of the coat is increased, the damping action is also increased.

$$\eta = \frac{eh(3+6h+4h^2+2eh^3+e^2h^4)\eta_2}{(1+eh)\{1+2eh(2+3h+2h^2)+e^2h^4\}}$$

where: $e=E_2/E_1$, $h=H_2/H_1$ $\eta_2$: an internal loss factor of coat $E_1$: Young's modulus of structure to be damped $E_2$: Young's modulus of coat $H_1$: Sheet thickness of structure to be damped $H_2$: Coating thickness of coat (2) A damping structural substance of the present invention is characterized in that the structure to be damped of (1) above is a piping.

In the above, as a damping coat is applied to the piping and a damping structural substance is formed, likewise as in (1) above, the damping structural substance provides good vibration absorption and sound absorption action, so that vibrations and sounds, transmitted to the piping, are absorbed well.

(3) A damping structural substance of the present invention is characterized in that the piping of (2) above is a refrigerant piping composing a refrigeration cycle.

In the above, as a damping coat is applied to the refrigerant piping and a damping structural substance is formed, likewise as in (2) above, the damping structural substance provides good vibration absorption and noise absorption action, so that vibrations and sounds transmitted to the refrigerant piping are absorbed well.

(4) A damping structural substance of the present invention is characterized in that the structure to be damped of (1) above is a piping unit consisting of a refrigerant piping composing a refrigeration cycle and a capillary tube being a decompression means.

In the above, as the damping coat is applied to the piping unit and the damping structural substance is formed, likewise as (1) above, the damping structural substance provides good vibration absorption and sound absorption action, so that vibrations and sounds transmitted to the piping unit are absorbed well.

(5) A damping structural substance of the present invention is characterized in that the structure to be damped of (1) above is a sheet material.

In the above, as the damping structural substance is formed by the damping coat being applied to the sheet material, likewise as in (1) above, the damping structural substance provides good vibration absorption and sound absorption action, so that vibrations and sounds transmitted to the sheet material are absorbed well.

(6) A damping structural substance of the present invention is characterized in that the sheet material of (5) above is an outer sheet material of a box substance containing a vibration source therein.

In the above, as the damping structural substance is formed by the damping coat being applied to the outer sheet material of the box substance containing a vibration source therein, likewise as (5) above, the damping structural substance provides good vibration absorption and sound absorption action, so that vibrations and sounds caused by the vibration source and transmitted to the outer sheet material are absorbed well.

(7) A damping structural substance of the present invention is characterized in that the box substance of (6) above is an air conditioning unit.

In the above, as the damping structural substance is formed by the damping coat being applied to the outer sheet material of the air conditioning unit, likewise as in (6) above, the damping structural substance does good vibration absorption and sound absorption actions, so that vibrations and sounds caused by the air conditioning unit and transmitted to the outer sheet material are absorbed well.

(8) A damping structural substance of the present invention is characterized in that the high molecular material of the damping structural substance of (1) through (7) above consists of any one of a polyacrylic ester, a polyurethane and an epoxy resin.

In the above, as the damping coat, formed by a molten liquid of any one of a polyacrylic ester, a polyurethane and an epoxy resin and a photopolymerization initiator being coated on the structure to be damped and by ultraviolet rays being irradiated, provides good damping actions, a damping structural substance which provides good vibration absorption and sound absorption actions can be obtained.

Further, as the polyacrylic ester etc. mixes well with the photopolymerization initiator and this molten liquid sticks well to the structure to be damped and is quickly hardened by ultraviolet rays being irradiated, the damping structural substance can be formed efficiently.

(9) A damping coat forming method of the present invention is characterized in that a molten liquid of a high molecular material of damping nature mixed with a photopolymerization initiator for causing a hardening reaction by a light irradiation is coated on the surface of a structure to be damped, then a light is irradiated to the structure to be damped and a photosetting damping coat is formed on the surface.

In the above, as the damping coat is formed by a light being irradiated to the structure to be damped, coated with the molten liquid of a high molecular material of damping nature mixed with a photopolymerization initiator, and by the high molecular material of damping nature being quickly hardened, a damping structural substance can be formed efficiently.

(10) A damping coat forming method of the present invention is characterized in that coating of the molten liquid of (9) above is made by the structure to be damped being dipped into the molten liquid.

In the above, as the coating is made by the molten liquid being sticked to the structure to be damped which is dipped into the molten liquid, the molten liquid is easily coated, and likewise as in (9) above, a damping structural substance can be formed efficiently.

(11) A damping coat forming method of the present invention is characterized in that coating of the molten liquid of (9) above is made by the structure to be damped being sprayed with the molten liquid.

In the above, as the structure to be damped is sprayed with the molten liquid, the molten liquid is quickly coated, and likewise as in (9) above, a damping structural substance can be formed efficiently.

(12) A damping coat forming method of the present invention is characterized in that temperature of the molten liquid of (9) above is adjusted and thereby thickness of the damping coat is adjusted.

In the above, as the thickness of damping coat can be adjusted by the temperature of molten liquid being adjusted and thereby its viscosity being adjusted, a damping structural substance applied by a damping coat having such thickness as to correspond to the size of vibrations can be formed.

BRIEF DESCRIPTION OF THE DRAWINGS

In the accompanying drawings;

FIGS. 2(*a*)–2(*b*) are explanatory drawings showing a method of forming a damping coat of a damping structural substance of the preferred embodiment, wherein FIG. 2(*a*) is an explanatory drawing of the forming process and FIG. 2(*b*) is an explanatory drawing of the forming apparatus.

FIGS. 3(*a*)–3(*b*) are explanatory drawings showing another method of forming a damping coat of a damping structural substance of the preferred embodiment, wherein FIG. 3(*a*) is an explanatory drawing of the forming process and FIG. 3(*b*) is an explanatory drawing of the forming apparatus.

DESCRIPTION OF THE PREFERRED EMBODIMENTS

Figure 1:
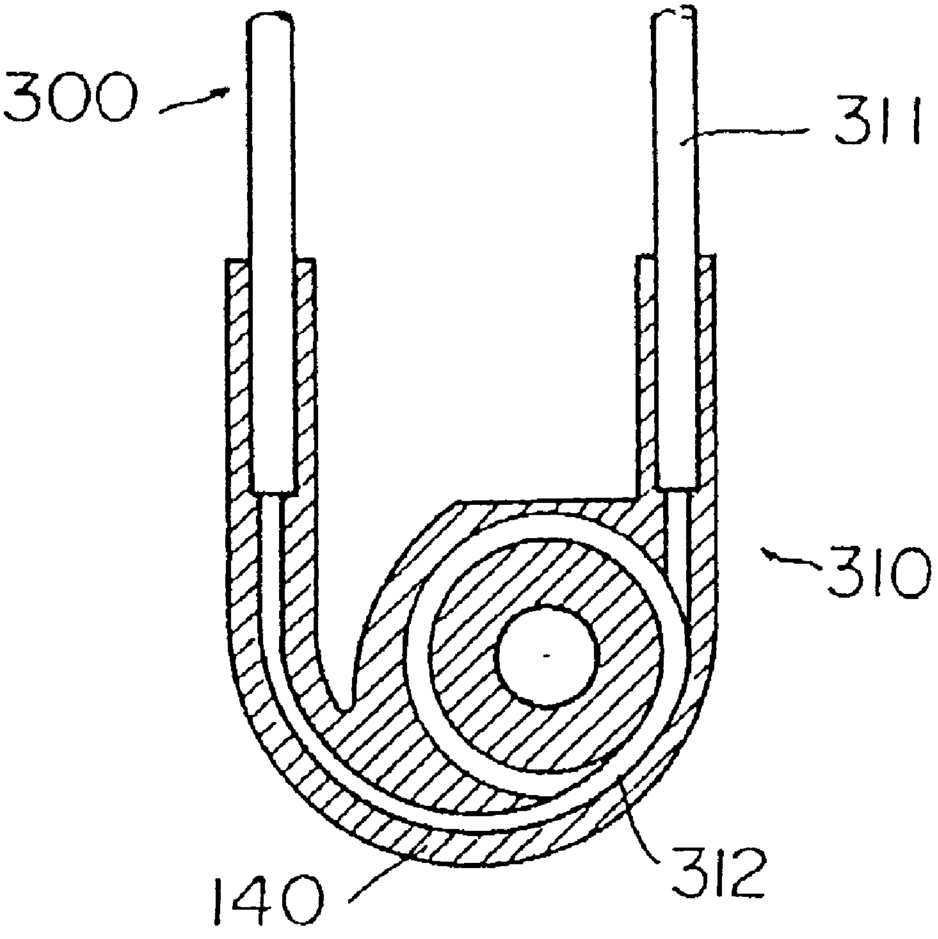
FIG. 1 is an explanatory drawing of a damping structural substance of one preferred embodiment according to the present invention.
Figure 4A:
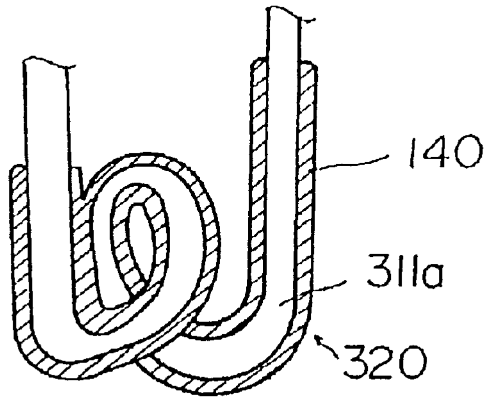
FIGS. 4(*a*)–4(*e*) are explanatory drawings of a damping structural substance of other preferred embodiments according to the present invention, wherein FIG. 4(*a*) is a case a structure to be damped being a loop pipe, FIG. 4(*b*) is of a case of a straight pipe, FIG. 4(*c*) is of a case of a snaky pipe, FIG. 4(*d*) is of a case of the damping coat of FIG. 4(*a*) being consecutive, and FIG. 4(*e*) is of a case of a structure to be damped being a sheet material.
Figure 4B:
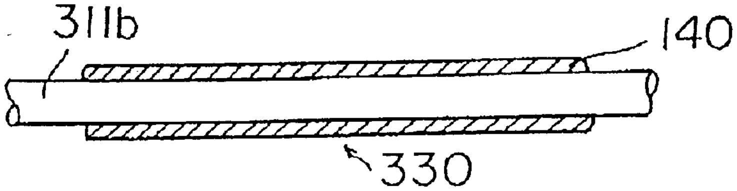
Figure 4C:
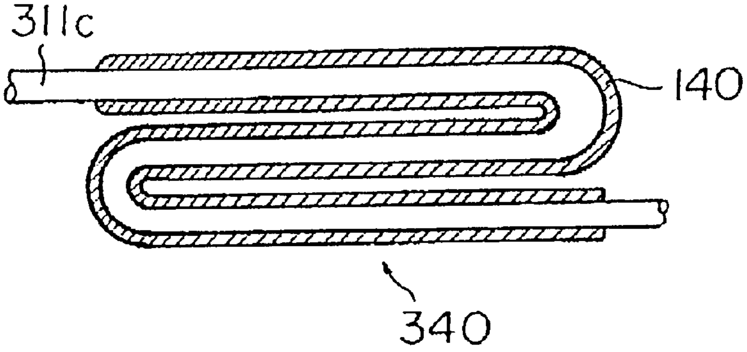
Figure 4D:
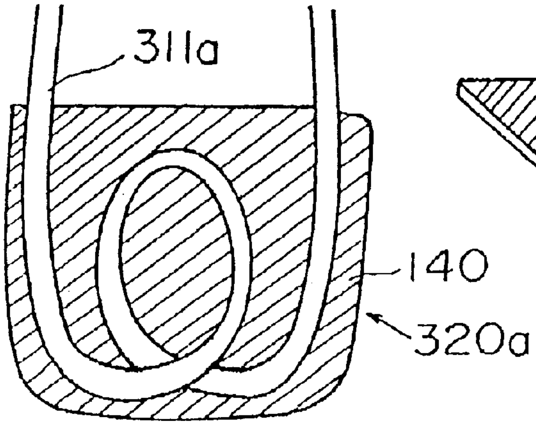
Figure 4E:
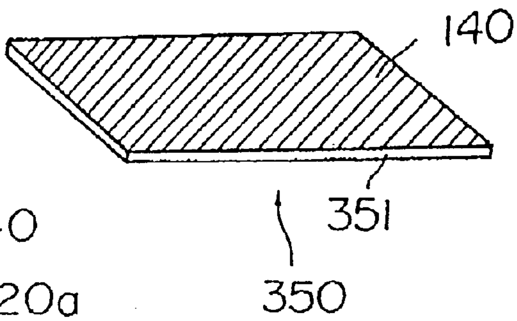
Figure 5:
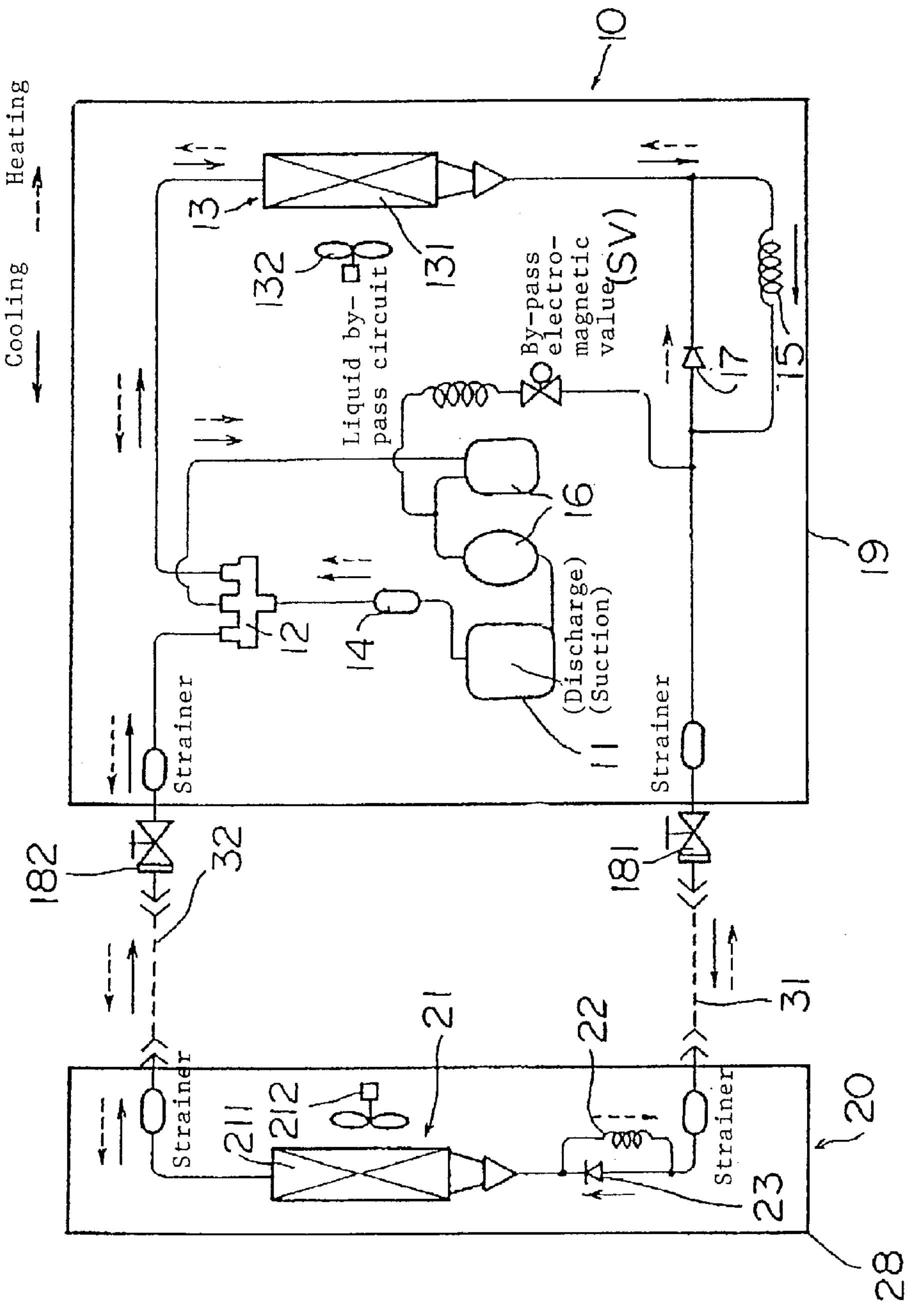
FIG. 5 is a diagrammatic drawing of refrigerant pipings in an air conditioner.
Figure 6:
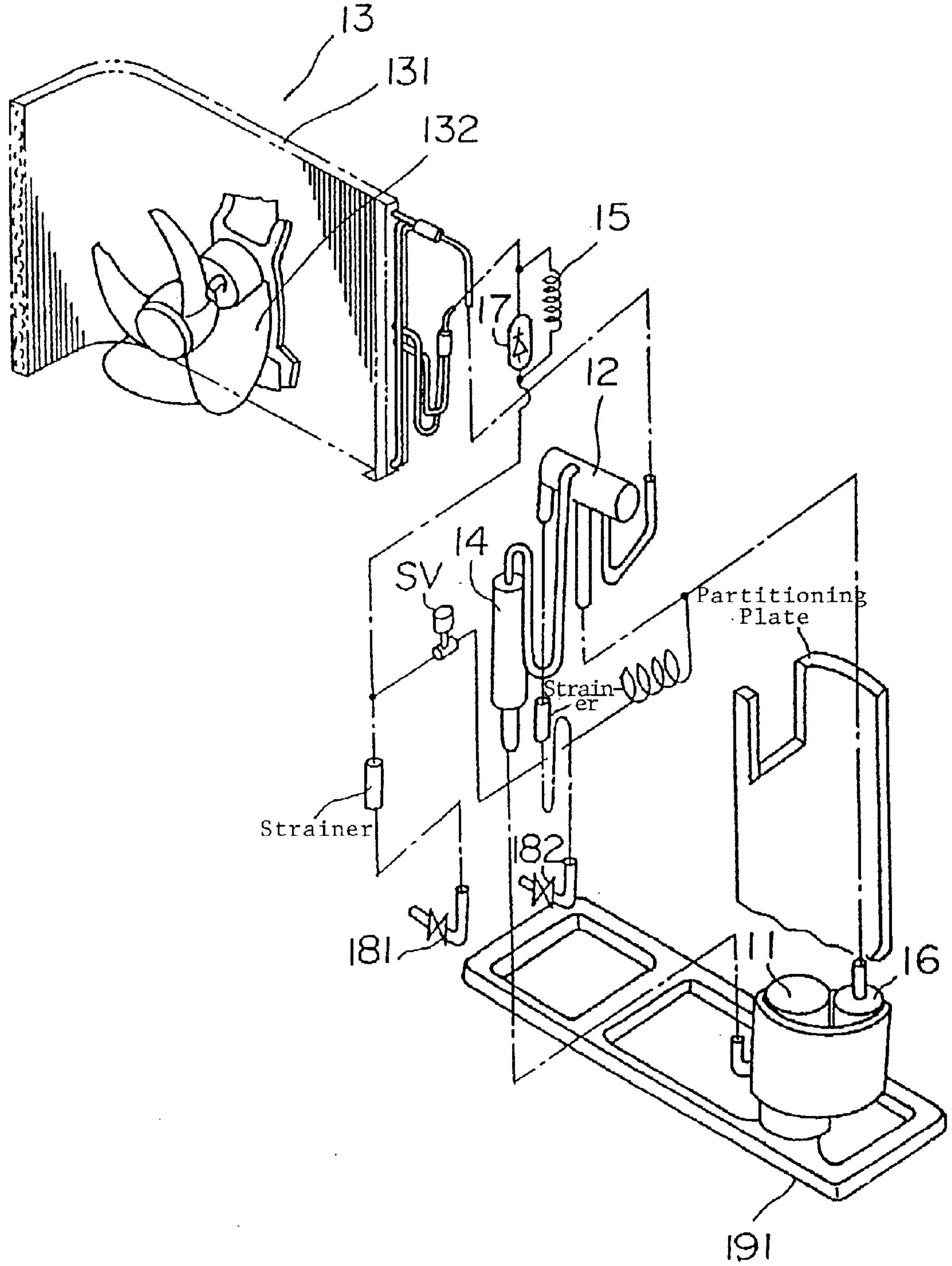
FIG. 6 is a structural drawing of an outdoor unit of the air conditioner.
Figure 7:
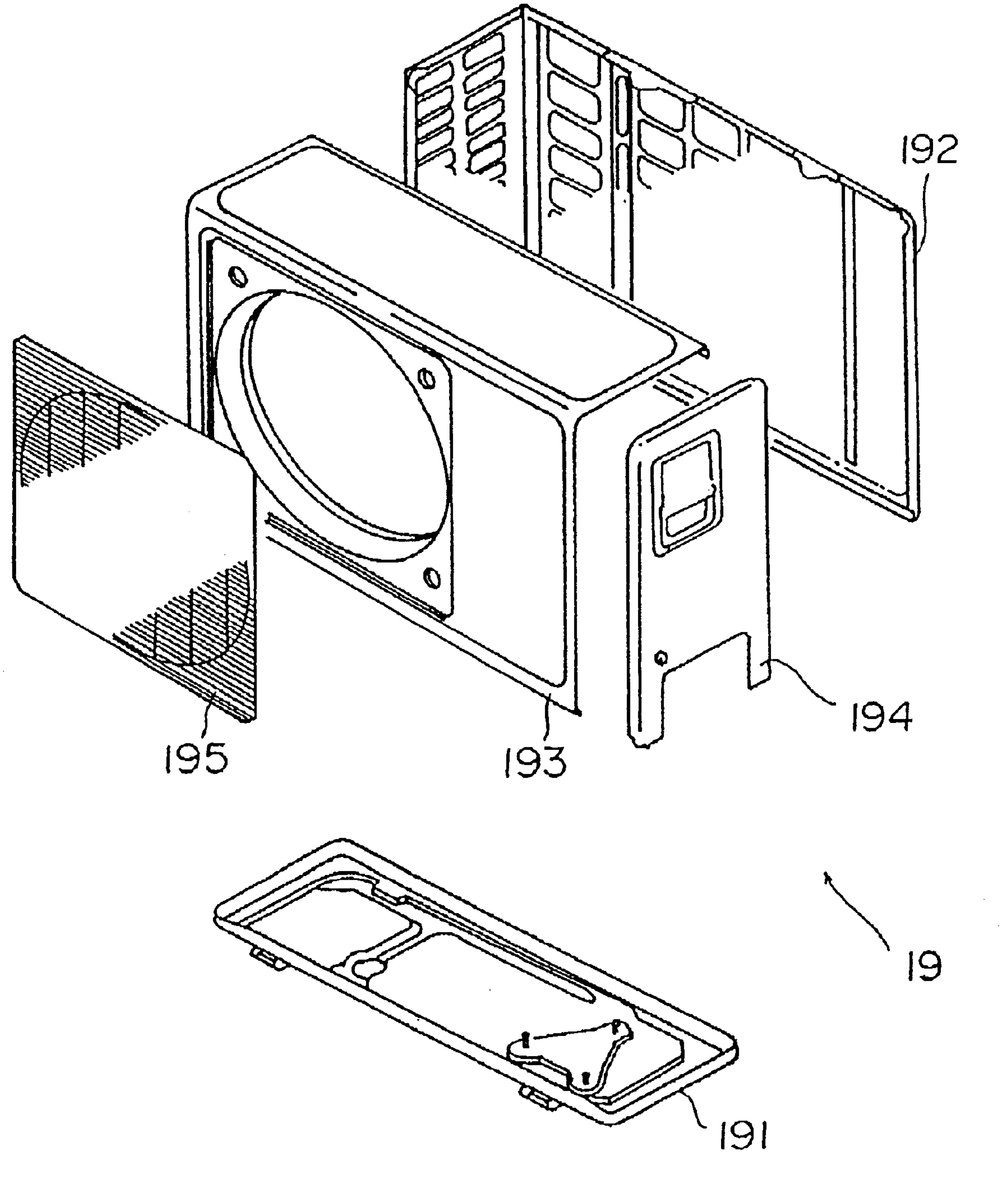
FIG. 7 is a structural drawing of an indoor unit of the air conditioner.
Figure 8A:
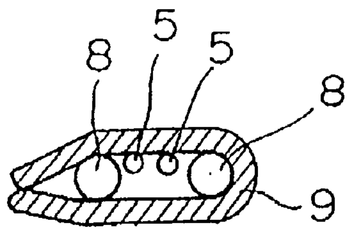
Fig. 8(a) (Prior Art)
FIGS. 8(*a*)–8(*b*) are explanatory drawings of a damping structural substance in the prior art.
Figure 8B:
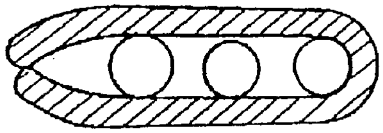
Fig. 8(b) (Prior Art)
Figure 9A:
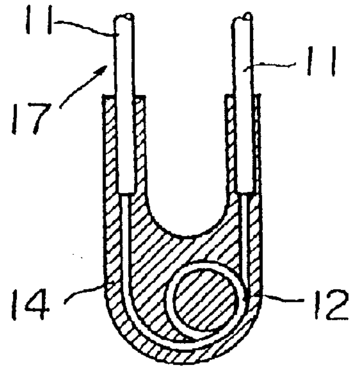
Fig. 9(a) (Prior Art)
FIGS. 9(*a*)–9(*b*) are explanatory drawings of a damping structural substance using a damping coat in the prior art and of its forming method.
Figure 9B:
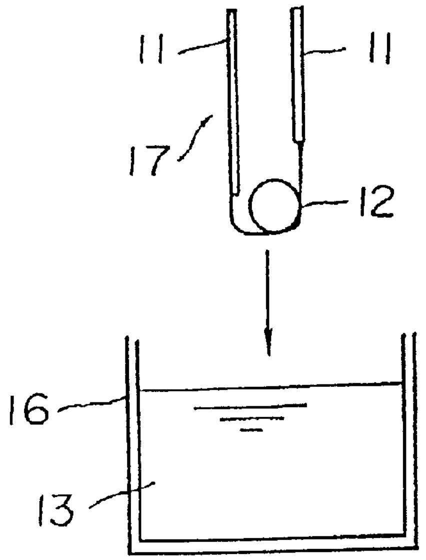
Fig. 9(b) (Prior Art)

A description is made on a damping structural substance of one preferred embodiment according to the present invention with reference to FIG. 1. This preferred embodiment is of a case where a structure to be damped is a piping unit 300, composed of a refrigerant piping 311 and a capillary tube 312, to be applied to an air conditioner forming the refrigeration cycle shown in FIG. 5. As the action of this refrigeration cycle is same as that of a conventional one, its description is omitted.

A damping structural substance 310 of this preferred embodiment as shown in FIG. 1 comprises the piping unit 300 composed of the refrigerant piping 311 and the capillary tube 311 connected to the refrigerant piping 311, both forming a refrigeration cycle, and a damping coat 140 formed by a urethane resin material, which is a high molecular material of damping nature, being coated in the vicinity of a connection portion of the refrigerant piping 311 and the capillary tube 312 and on the capillary tube 312.

Next, a damping coat forming method for forming the damping structural substance 310 of this preferred embodiment is described with reference to FIG. 2. In this damping coat forming method, as shown in FIG. 2(*b*), a dipping type coat forming apparatus 100 in which a vessel 110 is used. The vessel having a heater 120 and an agitator 180, and a lamp 150 are disposed is used, and processes A, B, C, D and F as shown in FIG. 2(*a*) are carried out.

More concretely, the urethane resin material is first mixed with a photopolymerization initiator and is heated to form a molten mixture 130, then the molten mixture 130 is put in the vessel 110 having the heater 120, and the piping unit 300, which is the structure to be damped, composed of the refrigerant piping 311 and the capillary tube 312 is dipped in the vessel 110 and is drawn up, thereby the molten mixture 130 is coated on the piping unit 300.

As the molten mixture 130 is previously mixed with a photopolymerization initiator to permit hardening by a light, the urethane race resin material is hardened instantly upon the lamp 150 making irradiating of ultra-violet rays, and the damping coat 140 is formed on the piping unit 300. Incidentally, as for the thickness of the damping coat 140, temperature of the molten mixture 130 is adjusted by the heater 120 and its viscosity is changed, so that the amount of coating is adjusted, thereby a damping coat 140 of a necessary thickness can be obtained.

In this preferred embodiment, as mentioned above, as the damping coat 140 is formed uniformly and yet without spaces, even between the refrigerant piping 311 and the capillary tube 312, by the urethane resin material being filled well, an excellent vibration absorption and sound absorption effect can be obtained and a non-uniformity in the vibration absorption and sound absorption effect can be depressed. Further, by virtue of the structure having excellent vibration absorption and sound absorption, thickness of the damping coat 140 can be made thinner and the space for the arrangement can be reduced.

Incidentally, in this preferred embodiment, a urethane resin material is used as a high molecular material to be mixed with a photopolymerization initiator, but a polyacrylic ester, an epoxy resin, etc. can be also applied. Further, this preferred embodiment relates to application to an air conditioner, but application to a refrigerator, other refrigeration units, etc. is also possible.

As for a formation of a damping structural substance according to the present preferred embodiment, other methods are also possible and herebelow described is another damping coat forming method with reference to FIG. 3.

In this damping coat forming method, as shown in FIG. 3(*b*), a spray type coat forming apparatus 200 in which a vessel 110 having a heater 120 and an agitator 180, a vessel 111 connected to the vessel 110 via a piping having a pump 160 and a nozzle 170, and a lamp 150 are disposed is used, and processes A, E, D and F as shown in FIG. 3(*a*) are carried out.

More concretely, as in the case of the previous method, a molten mixture 130 is first formed and is put in the vessel 110. After the molten mixture 130 is put in the vessel 110, a piping unit 300 is set in the vessel 111 and the molten mixture 130 in the vessel 110 is sucked by the pump 160 and is sprayed from the nozzle 170 to form a coating.

The piping unit 300, coated with the molten mixture 130, is irradiated with ultraviolet rays, as in the previous method, the urethane resin material is hardened and a damping coat 140 is formed.

Incidentally, in case of this method also, likewise as in the previous method, the thickness of the damping coat 140 can be adjusted by the temperature of the molten mixture 130 being adjusted, and as the high molecular material, a polyacrylic ester, an epoxy resin, etc., other than the urethane resin, can be also applied.

Damping structural substances of other preferred embodiments according to the present invention are described with reference to FIG. 4. In case of these preferred embodiments, the structures to be damped on which the damping coat is formed are different from that of the preferred embodiment as first described, but the damping coat is formed by the same method as first or subsequently described.

Those shown in FIGS. 4(*a*), (*b*) and (*c*) are damping structural substances 320, 330, 340 applied by damping coats 140 on a loop pipe 311*a*, a straight pipe 311*b* and a serpentine pipe 311*c*, respectively. In these cases also, same vibration absorption and sound absorption effects as the preferred embodiment as first described can be obtained. Incidentally, in this case, in order for the molten mixture not to be coated on the inner side of the members, blind plugs are applied during the coating process.

That shown in FIG. 4(*d*) is a damping structural substance 320*a* in which the damping coat 140 of FIG. 4(*a*) is formed consecutively between loop pipes 311*a*, and in this case, a vibration absorption and sound absorption effect of the damping structural substance 320*a* becomes larger. Also in the case of the serpentine pipe 311*c* shown in FIG. 4(*c*), like damping coat 140 can be formed and like effect can be obtained.

That shown in FIG. 4(*e*) is of a case of the structure to be damped being a sheet material 351 and a damping structural substance 350 formed by the structure to be damped being applied by a damping coat 140 shows the same vibration absorption and sound absorption effects, etc. as described in the above.

As for the sheet material 351, in case it is an outer sheet material of a box substance, even in a case of the box substance being an air conditioning unit, a damping structural substance is formed likewise by a damping coat being applied and can exhibit an excellent vibration absorption and sound absorption effects.

According to the damping structural substance and the damping coat forming method of the present invention, as the molten liquid of a high molecular material of damping nature mixed with.a photopolymerization initiator is coated on the surface of a structure to be damped,. then a light is irradiated and a damping structural substance is made by a damping coat being formed on the surface of the structure to be damped, a good absorption of vibrations and sounds transmitted to various structures to be damped such as pipings, sheet materials, etc. becomes possible.

Further, as the damping coat can be hardened quickly by a light irradiation, a drastic enhancement of productivity can be realized, and as the thickness of damping coat is adjusted by the temperature of molten high molecular material being adjusted, vibration absorption and sound absorption to meet the state of vibrations and sounds become possible.

The foregoing invention has been described in terms of preferred embodiments. However, those skilled in the art will recognize that many variations of such embodiments exist. Such variations are intended to be within the scope of the present invention and the appended claims.

What is claimed is:

1. A method for forming a damped vibratory structure of a capillary piping unit having a capillary tube formed in a loop shape and having connecting pipes connected to both ends of the capillary tube, which comprises applying a molten photopolymerizable polyurethane resin, mixed with a photopolymerization initiator for causing a hardening reaction by light irradiation, to a surface of the loop shaped portion of the capillary tube, then irradiating light on the loop shaped portion, whereby a photosetting damping coat is formed on the surface of the vibratory structure.

2. The method as claimed in claim 1, wherein a coating of the molten liquid is applied on the loop shaped portion by dipping it in the molten liquid.

3. The method as claimed in claim 1, wherein coating of the molten liquid is applied on the looped shaped portion by spraying it with the molten liquid.

4. The method as claimed in claim 1, wherein temperature of the molten liquid is adjusted to thereby control the thickness of the damping coat.

5. The method according to claim 1, where the adjacent portions of the capillary tube having a loop shape and connecting pipes are coated with the damping coat and are joined together by the coat.

6. The method according to claim 1, wherein the the loop shaped portion and at least a portion of the connecting pipes are embedded in the resin to form an integral structure.

* * * * *